(12) United States Patent
Malakapalli et al.

(10) Patent No.: US 8,756,660 B2
(45) Date of Patent: Jun. 17, 2014

(54) ENABLING TWO-FACTOR AUTHENTICATION FOR TERMINAL SERVICES

(75) Inventors: Meher Malakapalli, Sammamish, WA (US); Lisen Ding, Redmond, WA (US); Ido Ben-Shachar, Kirkland, WA (US); Ashwin Palekar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 12/105,247

(22) Filed: Apr. 17, 2008

(65) Prior Publication Data

US 2009/0328182 A1 Dec. 31, 2009

(51) Int. Cl.
*H04L 29/06* (2006.01)

(52) U.S. Cl.
USPC ............... 726/4; 726/3; 726/6; 713/168

(58) Field of Classification Search
USPC ............... 380/44, 54; 726/4, 6; 713/168, 182
See application file for complete search history.

(56) References Cited

U.S. PATENT DOCUMENTS

| | | | | |
|---|---|---|---|---|
| 6,606,708 | B1 * | 8/2003 | Devine et al. ............ | 726/8 |
| 7,809,953 | B2 * | 10/2010 | Little et al. ............ | 713/184 |
| 2001/0005890 | A1 * | 6/2001 | Nitaki ............ | 713/202 |
| 2002/0026590 | A1 * | 2/2002 | Kusunoki ............ | 713/201 |
| 2002/0064149 | A1 * | 5/2002 | Elliott et al. ............ | 370/352 |
| 2002/0178070 | A1 * | 11/2002 | Leveridge ............ | 705/26 |
| 2003/0188195 | A1 * | 10/2003 | Abdo et al. ............ | 713/201 |
| 2003/0217166 | A1 * | 11/2003 | Dal Canto et al. ............ | 709/229 |
| 2004/0221163 | A1 * | 11/2004 | Jorgensen et al. ............ | 713/182 |
| 2006/0029064 | A1 * | 2/2006 | Rao et al. ............ | 370/389 |
| 2006/0095788 | A1 * | 5/2006 | Bronstein et al. ............ | 713/185 |
| 2006/0195895 | A1 | 8/2006 | Shachar ............ | 726/11 |
| 2006/0242241 | A1 * | 10/2006 | Tock et al. ............ | 709/206 |
| 2007/0083750 | A1 * | 4/2007 | Miura et al. ............ | 713/155 |
| 2007/0162820 | A1 * | 7/2007 | Choi ............ | 714/758 |
| 2007/0180493 | A1 * | 8/2007 | Croft et al. ............ | 726/2 |
| 2007/0220271 | A1 * | 9/2007 | Law ............ | 713/185 |
| 2007/0282951 | A1 * | 12/2007 | Selimis et al. ............ | 709/205 |
| 2007/0282965 | A1 * | 12/2007 | Kataoka ............ | 709/213 |
| 2008/0072303 | A1 * | 3/2008 | Syed ............ | 726/10 |
| 2008/0212771 | A1 * | 9/2008 | Hauser ............ | 380/44 |
| 2009/0259838 | A1 * | 10/2009 | Lin ............ | 713/150 |

OTHER PUBLICATIONS

Jonathan Hassell, Learning Windows Server 2003, Feb. 13, 2006, O'Reilly Media, second edition, Chapter 10—Windows Terminal Services, pp. 536-566.*

* cited by examiner

*Primary Examiner* — Michael Simitoski
*Assistant Examiner* — Gary Lavelle
(74) *Attorney, Agent, or Firm* — Jim Sfekas; Kate Drakos; Micky Minhas

(57) ABSTRACT

Techniques for enabling two-factor authentication for terminal services are described. A client receives an authentication token from an authentication server. The authentication token is used as a factor for authenticating the client to a terminal services device. Native authentication of the client is also performed.

19 Claims, 6 Drawing Sheets

ENABLING TWO-FACTOR AUTHENTICATION FOR TERMINAL SERVICES

BACKGROUND

As computerized systems have increased in popularity, so have the needs to distribute files and processing resources of computer systems in networks both large and small. In general, computer systems and related devices communicate information over networks for a variety of reasons, for example, to exchange electronic messages, sell merchandise, provide account information, and so forth. One will appreciate, however, that as computer systems and their related applications have become increasingly more sophisticated, the challenges associated with sharing data and resources (e.g., a "device," "application," or "application component") on a network have also increased.

Some current ways for managing resources within a network include centralized computing scenarios, which can involve a centralized gateway server sharing resources with one or more clients that may not have those resources installed locally. One such example involves a centralized gateway server that allows a client computer system to login to the gateway server on a local intranet, or to login through a network firewall. The client computer can then access data and resources of interest through the firewall using a secure connection.

In one firewall example, the client computer system might tunnel through the firewall from a network layer at the client computer system to a corresponding network layer at the server computer system using a Virtual Private Network ("VPN"), Remote Access Server ("RAS"), or other type of firewall traversal connection. A tunneling firewall-traversal connection such as this generally involves a client using the Secure Hypertext Transfer Protocol ("HTTPS"), which is an HTTP mechanism that exchanges encrypted information using Secure Socket Layer ("SSL") or Transport Layer Security ("TLS") encryption mechanisms, to authenticate at a gateway server. After the gateway server allows passage through the firewall, the client computer system can then access all of the resources behind the firewall, such as by using one or more sockets to interact with a given resource.

With another firewall traversal solution, such as one that connects an application layer at the client with an application layer at the server, the client might also need to call out a protocol processor associated with the resource of interest. A protocol processor in this case is essentially an Application Program Interface ("API"), which is also typically designed as a plug-in (i.e., a "protocol processor plug-in") to the RPC/HTTPS communication stack. In addition to being configured for communicating with a certain type of resource or application program, the protocol processor plug-in is also typically designed to include certain network policies for using the given resource (or application). Thus, upon logging in, and upon passing any required levels of authentication required by the protocol processor plug-in, the client computer system can exchange information with the requested resource at the server computer system. For example, the client may be able to send mouse and keyboard events, which are then relayed to an appropriate resource. The resource then processes those events, and returns the results of this processing to the client for local display.

Within a firewall, it is relatively easy to configure server and client computers to provide a client access to applications and data contained on a server. Protocols, which may not be resistant to attack if exposed to the Internet, can be utilized effectively in such an environment that is not exposed to the Internet. Such environments are typical of many corporate intranets. Unfortunately, such a configuration does not provide for utilization of server resources outside the firewall.

Exposing the server directly to the Internet is generally not an option since it would be vigorously attacked with potentially disastrous consequences. As a result, it is common for corporate employees to utilize VPN technology to traverse a firewall and access the server from remote sites, such as from home or travel. While VPN technology provides a workable solution in many applications, VPN connections are hard to setup and maintain and may expose the server to problems present on the connected computer.

A Terminal Server ("TS") allows a remote client machine to access applications and resources on a server computer over a network. For example, Terminal Services is Microsoft's implementation of thin-client terminal server computing and allows a remote client machine to serve as a terminal emulator. A remote client machine may access Windows® applications and other resources of a computer running Terminal Services. The remote client may be running any operating system that supports the Terminal Services protocol. With Terminal Services, only the user interface is presented to the remote client. Input from the remote client, such as key presses and mouse clicks, is redirected over a network to the server. All application processing takes place on the computer. Applications are not downloaded or streamed to the remote client.

Software on the remote client manages the connection to Terminal Services. For example, Remote Desktop Connection software uses Remote Desktop Protocol ("RDP") to communicate with Terminal Services. As another example, an ActiveX control may embed Terminal Services communication functionality in a client application or a web page.

When a remote client connects to a TS, a login subsystem authenticates the connecting user. A TS console session is spawned Keyboard, mouse, and graphic drivers are replaced with RDP-specific drivers. Keyboard and mouse inputs are received over the network and presented to the console session. Virtual channels that allow other devices, such as disk drives and printers, to be redirected may be opened. The RDP protocol mediates the transfer of data between the remote client and the TS in a manner that should be transparent to applications running on the TS.

A Terminal Services Gateway Server ("TSG") provides a means to enable firewall traversal to provide access to a protected server or other intranet resources from clients outside the firewall. For example, RDP data may be tunneled through a firewall over a HTTPS channel. The TSG may provide for remote user authentication. The TSG may also mediate communication between the remote client and the TS.

An authentication factor is a piece of information and related process used to authenticate or verify a person's identity. Some examples of authentication factors are: a user password; a PIN; a smartcard; a biometric identifier (such as a fingerprint or retinal scan result); a security token; and a hardware device such as a USP token. Authentication factors are generally based on something a user knows (such as a password or PIN), something a user has (such as a smartcard or security token), or something the user is or does (such as a scanned fingerprint or voice identification). In some situations, a combination of security factors is used to provide enhanced security. For example, a bankcard and associated PIN are required to access most ATMs. Having a bankcard without the PIN or knowing the PIN without having the bankcard will generally not allow one to access a user's account on an ATM.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter TS and TSG may authenticate remote clients using authentication factors such as a password-based mechanism or a smartcard-based mechanism. The smartcard provides a two-factor authentication mechanism that has serious shortcomings. The combination requires a physical device, like the smartcard, and does not provide an extensible solution.

Mechanisms for providing multiple factor authentication are described herein. A client device requests authentication from an authentication server. The authentication server provides a token, such as for example a cookie containing a one-time password, to the client device. The client device connects to a server providing terminal services or to a gateway to such a server. The client device provides the token to the server or gateway and the token is verified. The client device then authenticates to the server in a standard fashion, perhaps using a native authentication method.

BRIEF DESCRIPTION OF THE DRAWINGS

The foregoing summary, as well as the following detailed description of preferred embodiments, is better understood when read in conjunction with the appended drawings. For the purpose of illustrating the invention, example embodiments are shown in the drawings; however, the invention is not limited to the specific methods and instrumentalities disclosed.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 1:
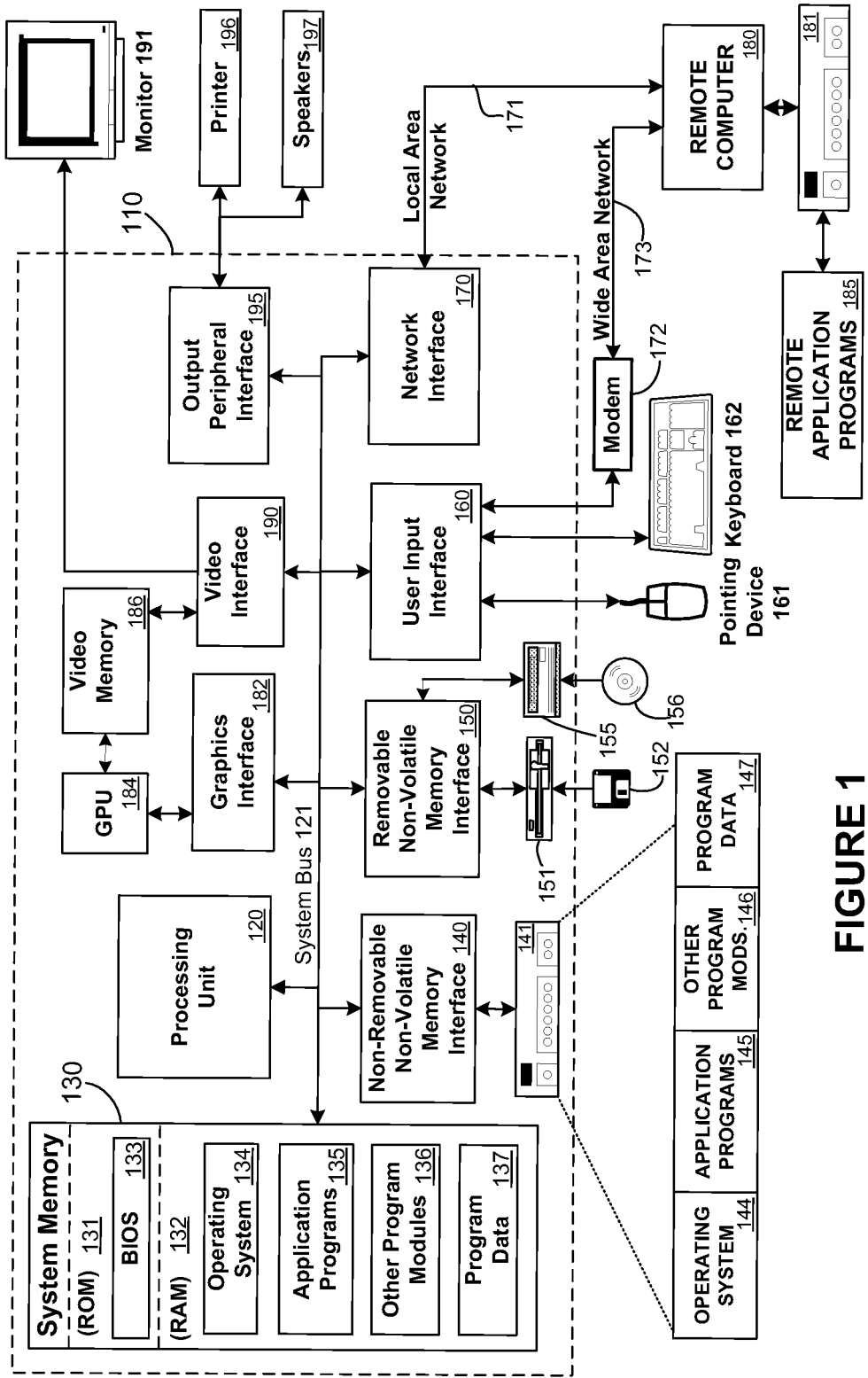
FIG. 1 is an example computing environment in which aspects of the techniques described herein may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 150, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol) to an application at the terminal server. The application processes the input as if the input was entered at the terminal server. The application generates output in response to the received input and the output is transferred over the network to the client computer system. The client computer system presents the output data. Thus, input is received and output presented at the client computer system, while processing actually occurs at the terminal server.

In most, if not all terminal server environments, input data (entered at a client computer system) typically includes mouse and keyboard data representing commands to an application and output data (generated by an application at the terminal server) typically includes video data for display on a video output device. Many terminal server environments also include functionality that extended protocols (e.g., developed to transfer input and output data) to transfer other types of data.

For example, virtual channels can be used to extend the RDP protocol by allowing plug-ins to transfer data over an RDP connection. Many such extensions exist. For example, features such as printer redirection, clipboard redirection, port redirection, etc., use virtual channel technology. Thus, in addition to input and output data, there may be many virtual channels that need to transfer data. Accordingly, at least from time to time, there may be requests to transfer output data and one or more channel requests to transfer other data contending for available network bandwidth.

Terminal servers are generally protected by a firewall. Some techniques for enabling terminal services through a firewall are described in U.S. patent application Ser. No. 11/067,125, published as U.S. publication number 2006/0195895, the complete disclosure of which is incorporated herein by reference.

Figure 2:
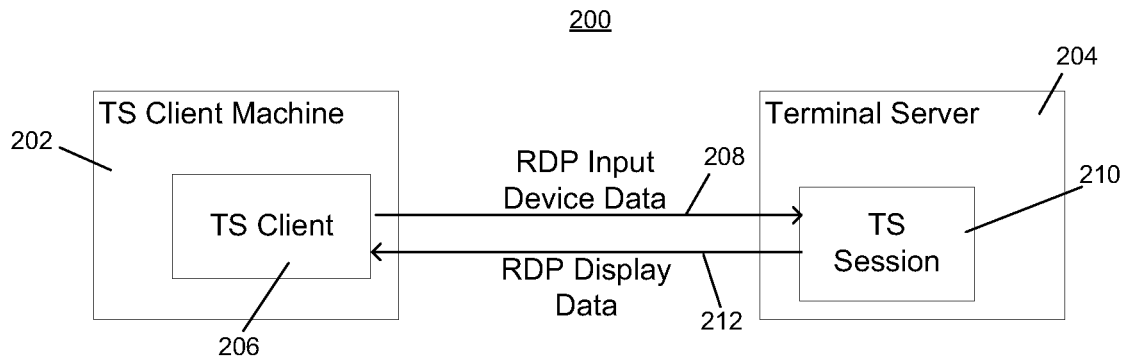
FIG. 2 illustrates a terminal server system implementing a Remote Desktop Protocol connection.

FIG. 2 shows an implementation 200 enabling terminal services. A TS client machine 202 and a TS 204 communicate using RDP. The TS client machine 202 runs a TS client process 206 that sends RDP input device data 208, such as for example keyboard data and mouse click data, to a TS session 210 that has been spawned on the TS and receives RDP display data 212, such as user interface graphics data. Generally, the TS client process 206 is a thin client process and most processing is provided on the TS 204.

Figure 3:
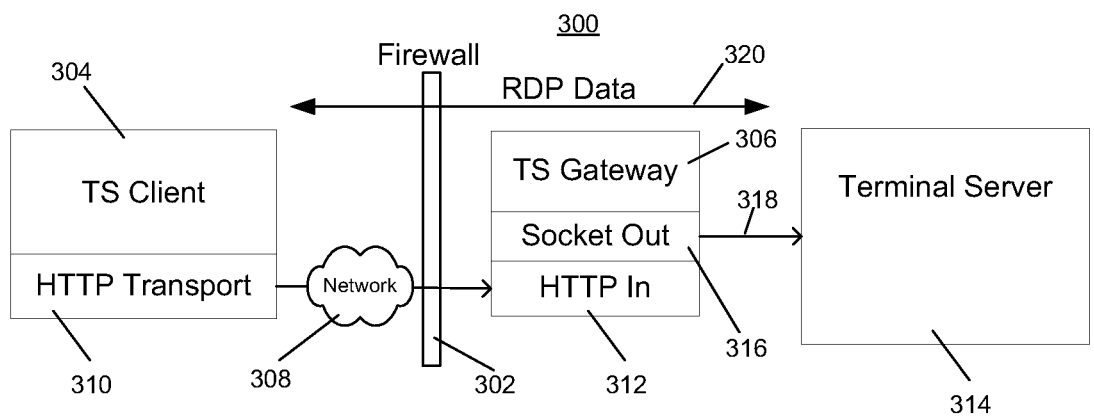
FIG. 3 illustrates a terminal server gateway system, wherein terminal server protocol is wrapped in HTTPS.

FIG. 3 shows an implementation 300 enabling terminal services through a firewall 302. A remote TS client 304 connects to a TSG 306 over a network 308. An HTTP transport process 310 on the TS client and an HTTP process 312 on the TSG 306 facilitate communication through the firewall 302. The HTTP transport process 310 wraps data for the TSG 306, such as for example Remote Procedure Call ("RPC") data or RDP data, in HTTPS headers. The TSG 306 may connect to a TS 314 via a socket out process 316 over a socket connection 318 to the TS 314. Once the TS client 304 is authenticated and a connection is established, RDP data 320 may be passed back and forth between the TS client 304 and the TS 314.

Figure 4:
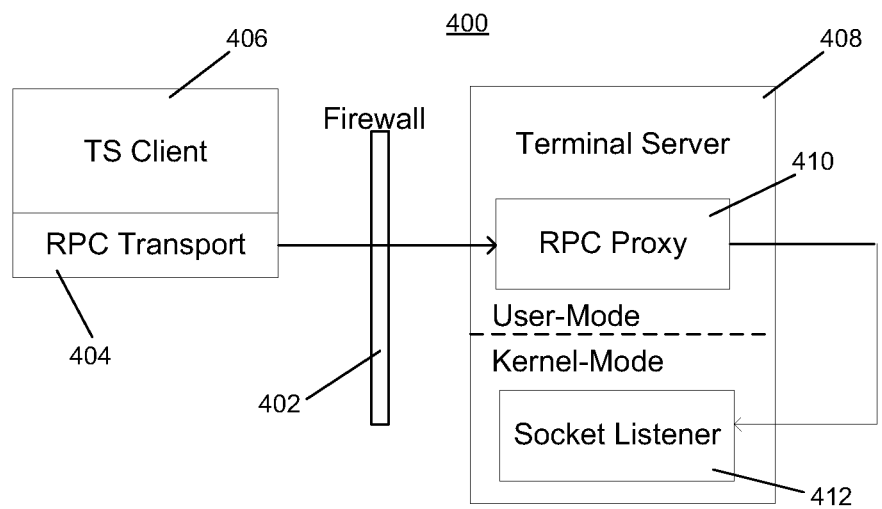
FIG. 4 illustrates a generalized system wherein an existing RPC/HTTP proxy is leveraged, thereby providing a terminal services protocol over RPC/HTTP.

FIG. 4 shows a generalized example of an implementation 400, wherein an existing RPC/HTTP (remote procedure call/hypertext transport protocol) proxy is leveraged, thereby providing a terminal services protocol, such as for example RDP, over an RPC/HTTP connection through a firewall 402. The architecture of the implementation illustrates that by wrapping the RDP protocol within RPC calls, an existing RPC-based proxy can be advantageously utilized. In particular, an RPC Transport Plug-In 404 on the TS client 406 wraps an RDP stream providing communication between the TS client 406 and the terminal server 408 within an RPC protocol. This facilitates utilization of an RPC-based proxy, thereby enabling firewall navigation. The RPC-based proxy 410, which may run in a user-mode on the TS, can forward received data to a socket listener 412, which may run in kernel-mode on the TS.

Figure 5:
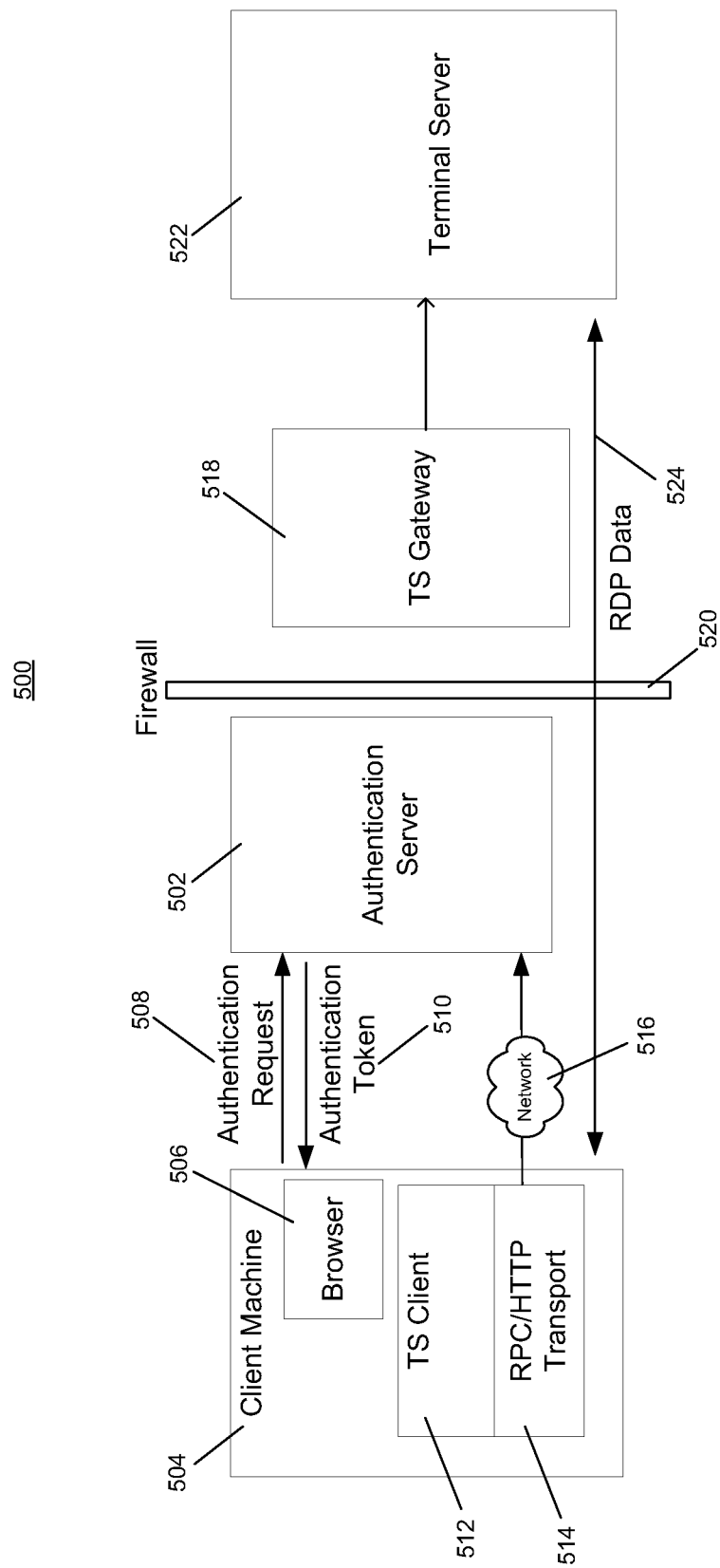
FIG. 5 illustrates a two-factor authentication system in accordance with the disclosure herein, using an independent authentication server and a terminal services gateway.

FIG. 5 shows a generalized example implementation of a system 500 for providing two-factor authentication using an authentication server 502. A client machine 504 has a connection to the authentication server 502 using, for example, a browser application 506. An authentication request 508 is sent from the browser application to the authentication server and an authentication token 510 is received in response. The authentication server 502 may, in some implementations, be provided by a third party independent of the terminal services provider. The authentication token 510 may, for example, take the form of a one-time password ("OTP") communicated in a cookie to the browser application 506.

A TS client process 512 runs on the client machine 504 and uses a HTTP Transport plug-in 514 for communications over a network 516 to a TSG 518 with the communication being mediated by the authentication server 502. The TSG 518 will usually be protected by a firewall 520. The authentication server 502 will usually be outside the firewall 520. The authentication server 502 receives data representative of the authentication token, for example in the form of an OTP cookie wrapped in an HTTP header. The cookie may be communicated via an RPC protocol wrapped in an HTTP format by an RPC/HHTP Transport module 514. The authentication server 502 verifies the authentication token data. This is followed by a normal authentication of the client by the TSG 518. Upon completion of this two-factor authentication, the TSG 518 communicates with the TS 522, and RDP data communication 524 between the TS client 512 and the TS 522 is established. Note that the functions performed by the TSG 518, in particular portions of the authentication process, may also be performed directly on the TS 522.

Figure 6:
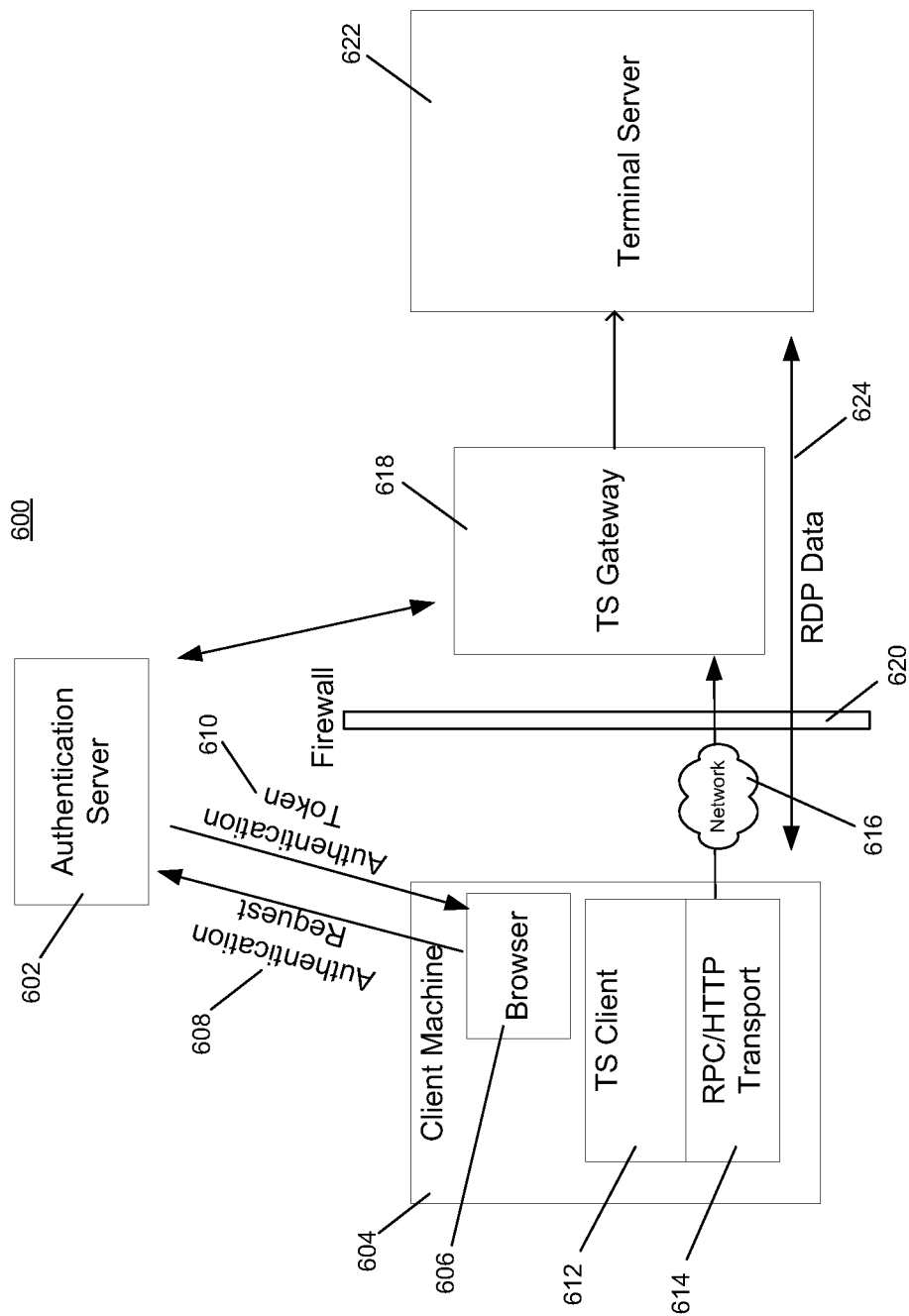
FIG. 6 illustrates another embodiment of a two-factor authentication system in accordance with the disclosure herein, using an independent authentication server and a terminal services gateway.

FIG. 6 shows another embodiment of an implementation of a system 600 for providing two-factor authentication using an authentication server 602. A client machine 604 has a connection to the authentication server 602 using, for example, a browser application 606. An authentication request 608 is sent from the browser application to the authentication server and an authentication token 610 is received in response. The authentication server 602 may, in some implementations, be provided by a third party independent of the terminal services provider. The authentication token 610 may, for example, take the form of a one-time password ("OTP") communicated in a cookie to the browser application 606.

A TS client process 612 runs on the client machine 604 and uses a HTTP Transport plug-in 614 for communications over a network 616 to a TSG 618. The TSG 618 will usually be protected by a firewall 620. The TSG 618 receives data representative of the authentication token, for example in the form of an OTP cookie wrapped in an HTTP header. The cookie may be communicated via an RPC protocol wrapped in an HTTP format by an RPC/HHTP Transport module 614. The TSG 618 verifies the authentication token data. This verification may involve communication between the TSG 618 and the authentication server 602. Verification of the authentication token data is followed by a normal authentication of the client by the TSG 618. Upon completion of this two-factor authentication, the TSG 618 communicates with the TS 622, and RDP data communication 624 between the TS client 612 and the TS 622 is established. Note that the functions performed by the TSG 618, in particular portions of the authentication process, may also be performed directly on the TS 622.

Although techniques are described herein with respect to enabling two-factor authentication, it should be understood that the techniques may be applied to any number of factors to provide general multi-factor authentication.

Figure 7:
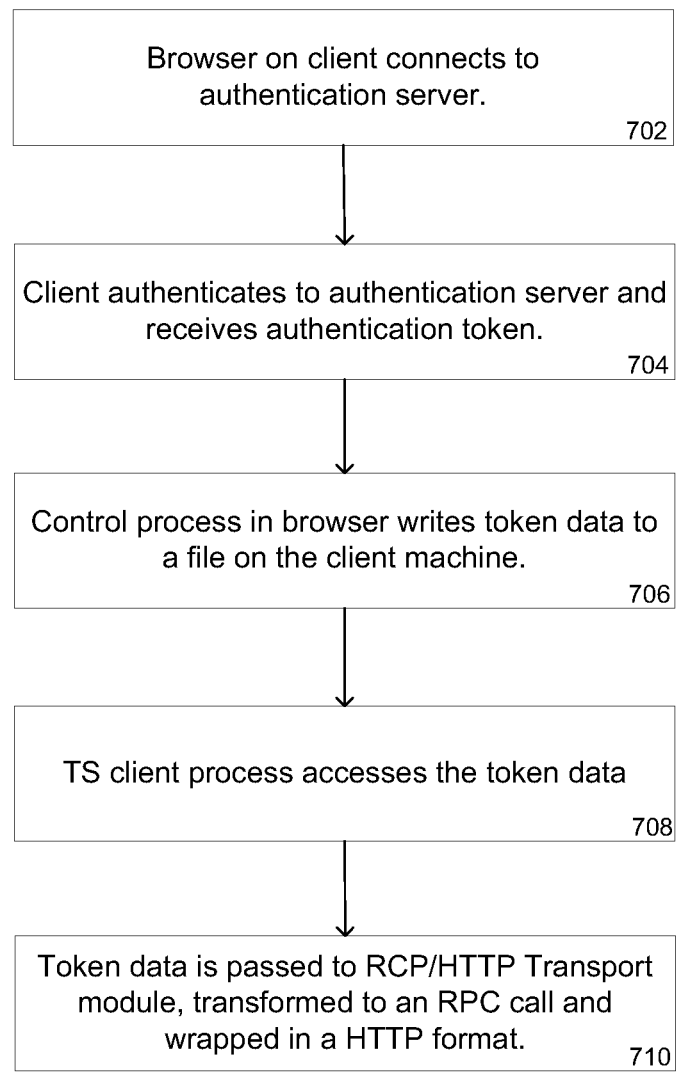
FIG. 7 illustrates an example method of handling an authentication token in accordance with two-factor authentication methods described herein.

FIG. 7 depicts an embodiment of a technique 700 for providing authentication cookie information to a TS client process. A browser process on a client machine connects to an authentication server 702. The client machine authenticates to the authentication server and receives an authentication token 704. In an embodiment, the authentication token is a one-time password provided in the form of a browser cookie. For security purposes, it may be desirable to send the cookie as a session cookie. Typically, a session cookie that has been provided to a browser is available only to the process that requested the cookie. This means that processes other than those within the browser application cannot access the cookie. However, for the two-factor authentication mechanism described herein, the cookie information must be made accessible to a TS client process on the client machine which is usually separate from the browser process. A control process within the browser, such as for example an ActiveX control running within an Internet Explorer browser, accesses the session cookie and writes the cookie data to a file on the client machine that will be accessible to the TS client process 706. The cookie data may be encrypted or otherwise transformed before being written to the file. The control process may provide the location of the file containing the cookie data to the TS client process.

The TS client process accesses the encrypted cookie data from the file and decrypts it if necessary 708. The cookie data is then passed to an RPC/HHTP Transport module that transforms the cookie data to an RPC call and wraps the RPC call in a HTTP format 710. The HTTP data is then communicated to an authentication server, a TSG or a TS for verification. After communicating the cookie data, the cookie file may be deleted from the client machine by the TS client process.

Figure 8:
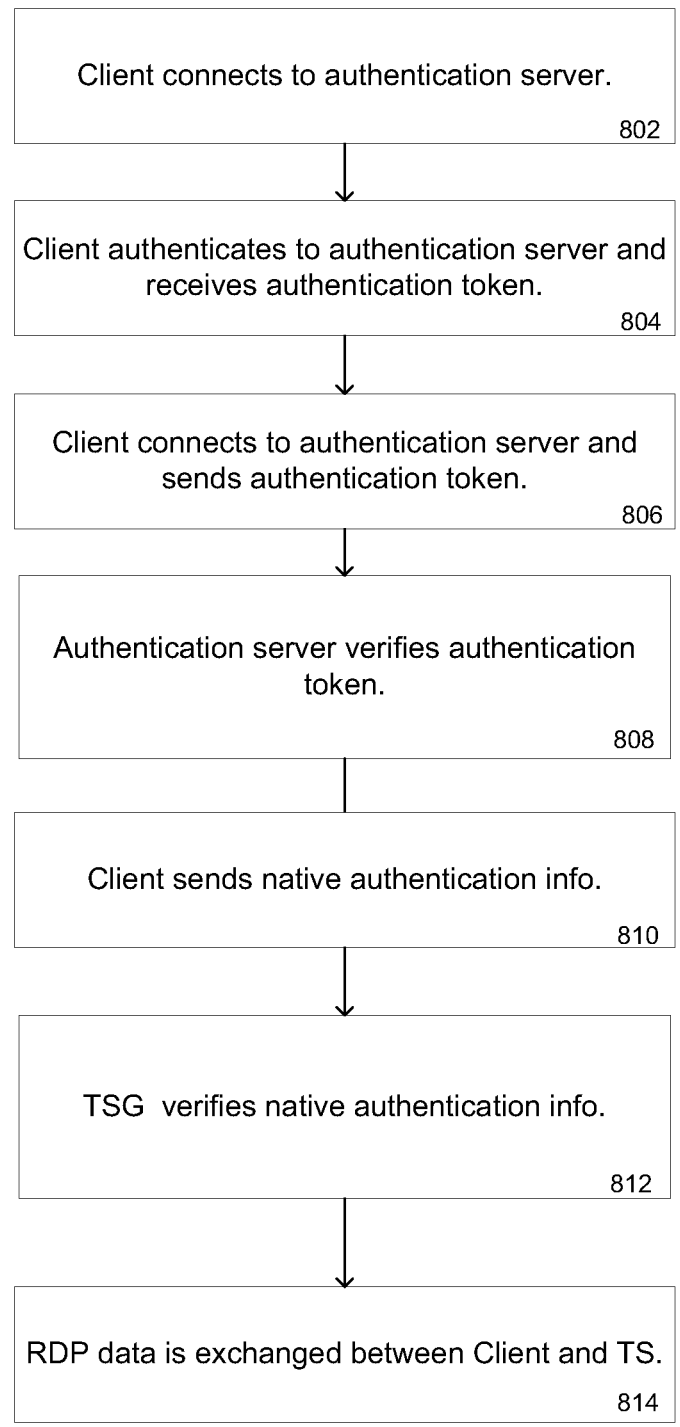
FIG. 8 illustrates an example method of providing two-factor authentication in accordance with the disclosure herein.

FIG. 8 depicts an overview of an embodiment of an implementation of a two-factor authentication process 800 for a terminal server. To initiate pre-authentication, a client connects to an authentication server 802, for example as described above. The client authenticates to the authentication server and receives an authentication token that may for example be data providing a one-time password 804. In some embodiments, the token will take the form of a browser cookie which may be encrypted and handled as described above.

The client establishes a connection to a TSG or to a TS 806. The connection may be mediated by an authentication server. Although the following describes the process when the client machine connects to a TSG, it should be understood that the processes described herein that are performed by the TSG could also be performed by the TS. A HTTP or a RPC/HTTP Transport module on the client machine sends authentication token data to the authentication server. The authentication server receives the authentication token data and verifies it 808. For example, the authentication server may be an Internet Security and Acceleration ("ISA") Server. The authentication token may be verified either before or after native authentication information is sent from the client to the TSG 810. The TSG then performs a normal native authentication of the client using the native authentication information 812. Native authentication information is data that is used to authenticate a user or device using systems operating on the authenticating device. For example, the TSG may perform a standard Windows authentication of the client. Upon successful completion of the two verifications, a RDP connection between the TS and the TS client is established and RDP data may be exchanged 814.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It should be understood that the various techniques described herein may be implemented in logic realized with hardware or software or, where appropriate, with a combination of both. Thus, the methods and apparatus, or certain aspects or portions thereof, may take the form of program code (e.g., instructions) embodied in tangible media, such as floppy diskettes, CD-ROMs, DVDs, hard drives, EPROMS, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs may be implemented in a high level procedural or object oriented programming language to communicate with a computer system, or may be implemented in assembly or machine language, if desired. In any case, the language may be a compiled or interpreted language, and combined with hardware implementations.

Although exemplary embodiments may refer to using aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

While the present disclosure has been described in connection with various embodiments and illustrated in various figures, it is understood that the methods and apparatus described herein may be adapted in a variety of ways. Therefore, the present disclosure should not be limited to any single aspect, but rather construed in breadth and scope in accordance with the appended claims.

What is claimed:

1. A method executed at a client device for authenticating a request for a remote presentation comprising:
    Receiving an authentication token using a first process running on the client device, the authentication token being received from an authentication server;
    writing data from the authentication token to a file on the client device using the first process, the file being accessible to a second process running on the client device, the second process being separate from the first process and being configured to enable a remote presentation between the client device and a terminal services device;
    passing authentication data from the file to a communications module using the second process, the communications module being configured to communicate data from the client device to the terminal services device and to the authentication server based on a protocol associated with the remote presentation;
    sending the authentication data in a format associated with the protocol to the terminal services device using the communications module;
    sending native authentication information to the terminal services device in the format associated with the protocol using the communications module; and
    receiving an indication that the terminal services device verified the authentication data with the server and that the terminal services device verified the native authentication information, the indication being received using the communications module.

2. The method of claim 1, wherein the authentication token is a one-time password.

3. The method of claim 1, wherein the first process is a browser, the second process is a terminal service client process, the authentication token is formatted as a browser cookie, wherein writing data to a file comprises encrypting data in the browser cookie and storing the encrypted data in the file, wherein passing authentication data from the file to a communications module comprises decrypting the data and sending the decrypted data to the communications module, and wherein sending the authentication data in a format associated with the protocol comprises the communications module transforming the decrypted data to a remote procedure call and wrapping the remote procedure call in a hypertext transfer protocol format.

4. The method of claim 1, wherein the native authentication information comprises a user identification and a user password.

5. The method of claim 1, wherein the remote presentation comprises a remote desktop protocol communications session.

6. The method of claim 1, wherein receiving an authentication token using the first process comprises:
    requesting, using an Internet browser interface, an authentication token from the authentication server; and
    receiving the authentication token formatted as a browser cookie.

7. The method of claim 1, wherein sending the authentication data in a format associated with the protocol comprises sending HTTP data comprising a remote procedure call, wherein the remote procedure call comprises information associated with the authentication data.

8. A computer-readable storage device having stored therein instructions to authenticate a request for a remote presentation that upon execution on a first device at least cause the first device to:
    receive of an authentication token using a first process running on the first device, the authentication token being received from an authentication computing device;
    write data from the authentication token to a file on the first device using the first process, the file being accessible to a second process running on the first device, the second process being separate from the first process and being configured to enable a remote presentation between the first device and a terminal services device;
    pass authentication data from the file to a communications module using the second process, the communications module being configured to communicate data from the first device to the terminal services device and to the authentication computing device based on a protocol associated with the remote presentation;
    send the authentication data in a format associated with the protocol to the terminal services device using the communications module;
    send native authentication information to the terminal services device in the format associated with the protocol using the communications module; and
    receive an indication that the terminal services device verified the authentication data with the server and that the terminal services device verified the native authentication information, the indication being received using the communications module.

9. The computer-readable storage device as recited in claim 8, wherein the authentication token is a one-time password.

10. The computer-readable storage device as recited in claim 8, wherein the first process is a browser, the second process is a terminal service client process, the authentication token is formatted as a browser cookie, wherein the instruction that at least cause the first device to write data to a file comprises encrypting data in the browser cookie and storing the encrypted data in the file, wherein the instruction that at least cause the first device to pass authentication data from the file to a communications module comprises decrypting the data and sending the decrypted data to the communications module, and wherein the instruction that at least cause the first device to send the authentication data in a format associated with the protocol comprises the communications module transforming the decrypted data to a remote procedure call and wrapping the remote procedure call in a hypertext transfer protocol format.

11. The computer-readable storage device as recited in claim 8, wherein the native authentication information comprises a user identification and a user password.

12. The computer-readable storage device as recited in claim 8, wherein the remote presentation comprises a remote desktop protocol communications session.

13. The computer-readable storage device as recited in claim 8, wherein the instruction that at least cause the first device to receive an authentication token using the first process comprises instructions that cause the first device to:

request, using an Internet browser interface, an authentication token from the authentication server; and receive the authentication token formatted as a browser cookie.

14. The computer-readable storage device as recited in claim 8, wherein the instruction that at least cause the first device to send the authentication data in a format associated with the protocol comprises instructions that cause the first device to send HTTP data comprising a remote procedure call, wherein the remote procedure call comprises information associated with the authentication data.

15. A system for authenticating a request for a remote presentation, comprising:

a processor; and memory coupled to the processor having stored thereon instructions that upon execution on the processor cause the system to:

receive of an authentication token using a first process running on the system, the authentication token being received from an authentication computing device;

write data from the authentication token to a file on the system using the first process, the file being accessible to a second process running on the system, the second process being separate from the first process and being configured to enable a remote presentation between system and a terminal services device;

pass authentication data from the file to a communications module using the second process, the communications module being configured to communicate data from the system to the terminal services device and to the authentication computing device based on a protocol associated with the remote presentation;

send the authentication data in a format associated with the protocol to the terminal services device using the communications module;

send native authentication information to the terminal services device in the format associated with the protocol using the communications module; and receive an indication that the terminal services device verified the authentication data with the server and that the terminal services device verified the native authentication information, the indication being received using the communications module.

16. The system as recited in claim 15, wherein the authentication token is a one-time password.

17. The system as recited in claim 15, wherein the first process is a browser, the second process is a terminal service client process, the authentication token is formatted as a browser cookie, wherein the instruction that at least cause the system to write data to a file comprises encrypting data in the browser cookie and storing the encrypted data in the file, wherein the instruction that at least cause the system to pass authentication data from the file to a communications module comprises decrypting the data and sending the decrypted data to the communications module, and wherein the instruction that at least cause the system to send the authentication data in a format associated with the protocol comprises the communications module transforming the decrypted data to a remote procedure call and wrapping the remote procedure call in a hypertext transfer protocol format.

18. The system as recited in claim 15, wherein the native authentication information comprises a user identification and a user password.

19. The system as recited in claim 15, wherein the remote presentation comprises a remote desktop protocol communications session.

* * * * *